United States Patent [19]

Ciokajlo et al.

[11] Patent Number: 5,443,590
[45] Date of Patent: Aug. 22, 1995

[54] ROTATABLE TURBINE FRAME

[75] Inventors: John J. Ciokajlo, Henderson, Nev.; Ambrose A. Hauser, Wyoming; Samuel H. Davison, Milford, both of Ohio

[73] Assignee: General Electric Company, Cincinnati, Ohio

[21] Appl. No.: 80,669

[22] Filed: Jun. 18, 1993

[51] Int. Cl.$^6$ .................................................. F01D 1/24
[52] U.S. Cl. ........................ 416/128; 416/223 A; 415/192; 415/65; 60/268; 60/39.162
[58] Field of Search ............... 60/39.162, 268; 415/65, 415/68, 69, 192; 416/128, 129, 192, 223 A

[56] References Cited

U.S. PATENT DOCUMENTS

| | | | |
|---|---|---|---|
| 2,962,260 | 11/1960 | Foley | 416/223 A |
| 3,883,264 | 5/1975 | Rao | 415/119 |
| 3,903,690 | 9/1975 | Jones | 60/39.08 |
| 4,767,271 | 8/1988 | Catlow | 416/129 |
| 4,790,133 | 12/1988 | Stuart | 60/226.1 |
| 4,860,537 | 8/1989 | Taylor | 60/226.1 |
| 5,079,916 | 1/1992 | Johnson | 60/268 |

FOREIGN PATENT DOCUMENTS

| | | |
|---|---|---|
| 0486082 | 5/1992 | European Pat. Off. |
| 0686078 | 7/1930 | France |
| 3237669 | 4/1984 | Germany |
| 586570 | 3/1947 | United Kingdom |
| 1010401 | 11/1965 | United Kingdom |
| 2114669 | 8/1983 | United Kingdom |

Primary Examiner—Richard A. Bertsch
Assistant Examiner—William J. Wicker
Attorney, Agent, or Firm—Jerome C. Squillaro; Bernard E. Shay

[57] ABSTRACT

A rotatable turbine frame includes annular outer and inner bands having a plurality of circumferentially spaced apart struts extending therebetween. An annular drive shaft is fixedly joined to the inner band for transmitting output torque therefrom, and the struts are backwardly radially inclined relative to the direction of rotation of the frame so that gas flow between the struts tends to straighten the inclined struts to effect a compressive load component therein.

5 Claims, 3 Drawing Sheets

5,443,590

ROTATABLE TURBINE FRAME

The present invention relates generally to gas turbine engines, and, more specifically, to a rotating turbine frame therein.

BACKGROUND OF THE INVENTION

Conventional gas turbine engines include one or more rotors which are suitably mounted in bearings and supported by stationary frames. The frames provide rigidity for controlling the dynamic response of the rotor system and for minimizing blade tip clearances due to inherent flexibility during operation.

Multiple rotors in a gas turbine engine increase the complexity of the mounting system therefor, and engines having counterrotating power turbines yet further increase the complexity of the system. In one exemplary counterrotating power turbine design as disclosed in U.S. patent application Ser. No. 08/080,666, filed 6/18/93, entitled "Gas Turbine Engine Rotor Support System," assigned to the present assignee, a rotor support system includes rotating forward and aft turbine frames integrally joined to outer and inner rotors of a counterrotating power turbine. The turbine frames provide increased structural rigidity of the power turbine for controlling blade tip clearances, but since the turbine frames rotate, they are subject to centrifugally generated tensile stresses in the struts thereof. Accordingly, the struts must be suitably designed to accommodate the centrifugal tensile stresses for obtaining a suitable useful life of the power turbine.

SUMMARY OF THE INVENTION

A rotatable turbine frame includes annular outer and inner bands having a plurality of circumferentially spaced apart struts extending therebetween. An annular drive shaft is fixedly joined to the inner band for transmitting output torque therefrom, and the struts are backwardly radially inclined relative to the direction of rotation of the frame so that gas flow between the struts tends to straighten the inclined struts to effect a compressive load component therein.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
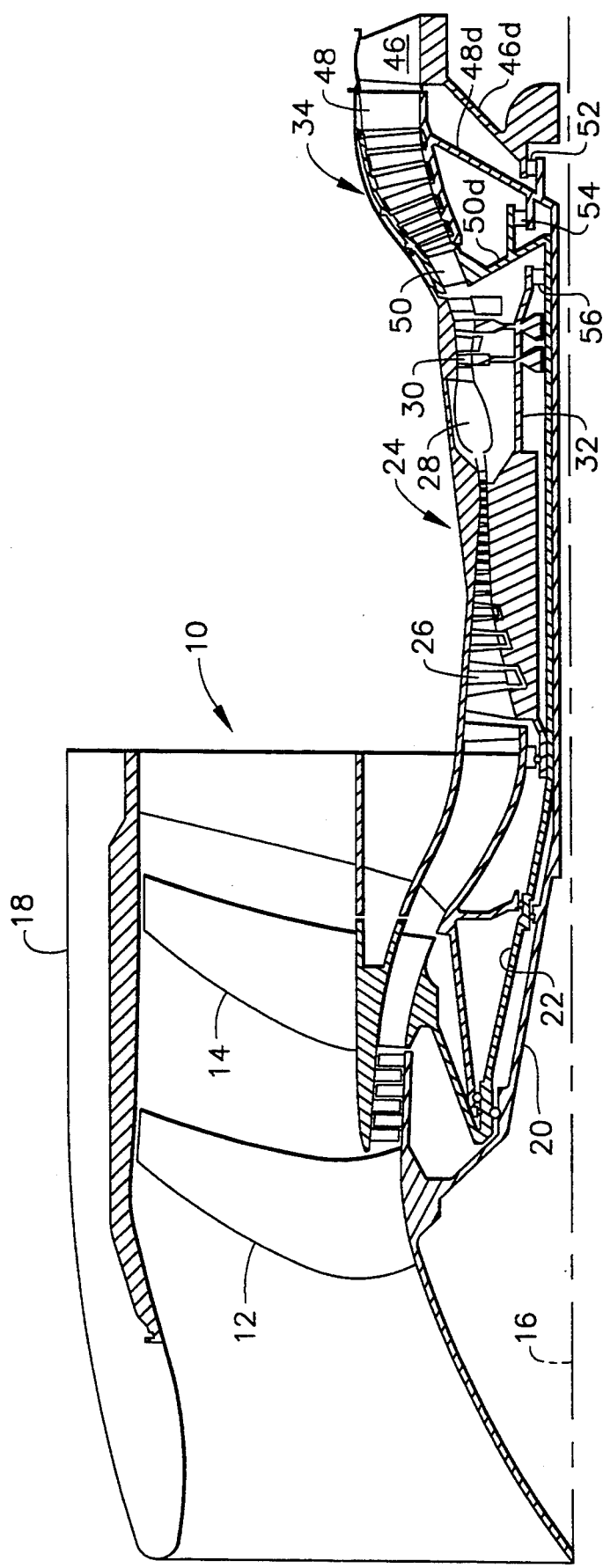
FIG. 1 is a schematic, longitudinal partly sectional view of an exemplary turbofan gas turbine engine having a counterrotating power turbine including rotating turbine frames in accordance with exemplary embodiments of the present invention.

Illustrated in FIG. 1 is an exemplary aircraft gas turbine engine 10 having an axially front fan 12 and an aft fan 14 disposed axially downstream therefrom about a longitudinal centerline axis 16. The fans 12, 14 include conventional rows of fan blades disposed within a conventional nacelle 18, with the blades being joined to respective rotor disks receiving power through a front fan shaft 20 joined to the front fan 12 and an aft fan shaft 22 joined to the aft fan 14.

Disposed downstream from the fans is a conventional core engine 24 including a high pressure compressor (HPC) 26, combustor 28, and an exemplary two-stage core or high pressure turbine 30 joined to the HPC 26 by a core shaft 32. The core engine 24 conventionally generates combustion gases which flow downstream therefrom to a counterrotating power turbine 34 which extracts energy therefrom for powering the fans 12, 14 through their respective fan shafts 20, 22.

Figure 2:
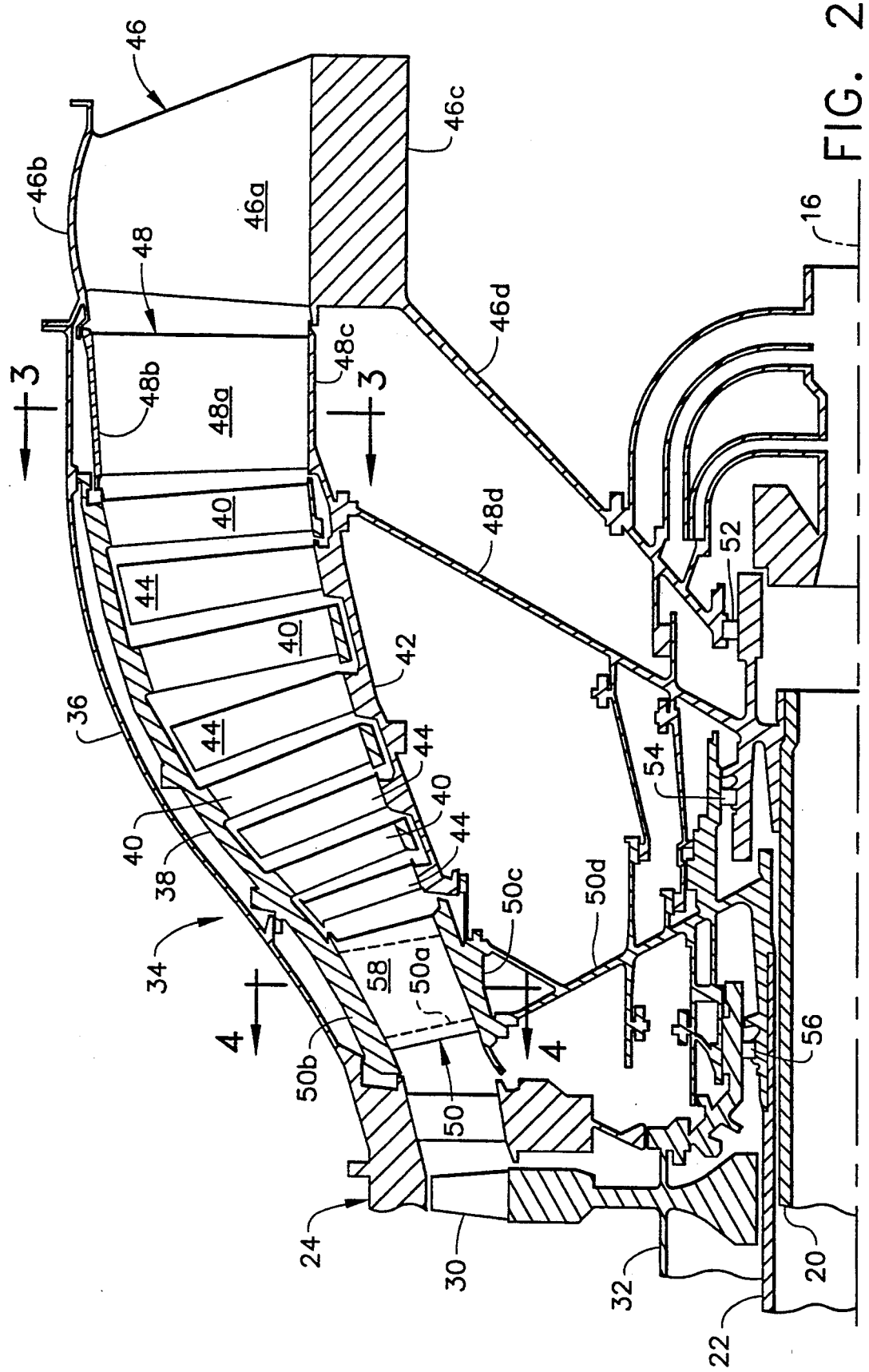
FIG. 2 is an enlarged longitudinal, partly sectional view of the power turbine illustrated in FIG. 1 showing in more detail forward and aft rotating turbine frames therein.

The power turbine 34 is illustrated in more particularity in FIG. 2 and includes a stationary outer casing 36 conventionally joined to the core engine 24 at the core turbine 30. The power turbine 34 includes a radially outer rotor 38 in the form of a generally frustoconical drum having a plurality of conventional outer rotor blades 40 extending radially inwardly therefrom in axially spaced apart blade row stages, four being illustrated for example. A radially inner rotor 42 is disposed coaxially with the outer rotor 38 about the centerline axis 16 and includes a plurality of conventional inner rotor blades 44 extending radially outwardly therefrom in axially spaced apart blade row stages, four being shown for example, which are interdigitated with the outer blade stages, with blade stages of the respective outer and inner rotors 38, 42 being disposed axially between respective stages of the other rotor as is conventionally known.

A rotor support system includes a stationary rear frame 46 disposed aft of the outer and inner blades 40, 44 of the power turbine 34. The rear frame 46 includes a plurality of conventional circumferentially spaced-apart struts 46a joined at their outer ends to an annular outer band 46b which in turn is conventionally fixedly joined to the outer casing 36, and joined at their inner ends to an annular inner band or hub 46c. The rear frame 46 also includes an annular rear support shaft 46d extending radially inwardly therefrom. In the exemplary embodiment illustrated in FIG. 2, the rear struts 46a are disposed in flow communication with the aft end of the power turbine 34 for receiving the combustion gases therefrom and do not include conventional fairings surrounding the struts since the combustion gases are at a relatively low temperature.

A rotatable aft frame 48 is disposed axially aft of the outer and inner blades 40, 44 and axially forward of the rear frame 46 and is fixedly joined to one of the outer and inner rotors 38, 42 for rotation therewith and for providing additional rigidity for supporting the blades thereof. The aft frame 48 includes a plurality of circumferentially spaced apart struts 48a fixedly joined to radially outer and inner annular aft bands 48b, 48c, with the inner aft band 48c being fixedly joined to an annular aft support shaft 48d for rotation therewith which extends radially inwardly therefrom and axially forward of the rear frame 46. The outer and inner bands 48b, 48c join together the several struts 48a for creating a relatively rigid assembly. In the exemplary embodiment illustrated in FIG. 2, the aft frame 48 at the inner band 48c is fixedly joined to the inner rotor 42.

A rotatable annular forward frame 50 is disposed axially forward of the outer and inner blades 40, 44 and similarly includes a plurality of circumferentially spaced apart forward struts 50a fixedly joined to radially outer and inner annular front bands 50b, 50c, with the inner front band 50c being fixedly joined to an annular forward shaft 50d extending radially inwardly therefrom. In the exemplary embodiment illustrated in FIG. 2, the forward frame 50 at the outer band 50b is fixedly joined to the outer rotor 38 for rotation therewith. In the exemplary embodiment illustrated in FIG. 2, each of the forward struts 50a is enclosed by a conventional fairing 58 to protect the struts 50a from the hot combustion gases flowing therebetween.

Although the outer band 50b of the forward frame 50 is joined to the outer rotor 38, and the inner band 48c of the aft frame 48 is joined to the inner rotor 42 in this exemplary embodiment, in an alternate embodiment the outer band 48b of the aft frame 48 could instead be joined to the outer rotor 38 with the inner band 48c being disconnected from the inner rotor 42, and the inner band 50c of the forward frame 50 would instead be joined to the inner rotor 42 with the outer band 50b being disconnected from the outer rotor 38. In either embodiment, the rear frame 48 is joined to one of the outer and inner rotors 38, 42 for rotation therewith, and the forward frame 50 is joined to the other thereof for rotation therewith. In either embodiment, each of the frames 48, 50 is a relatively rigid structure since the respective struts thereof are joined to the respective outer and inner annular bands. The rigidity of the frames 48, 50 is used in accordance with the present invention to increase the rigidity of the respective rotors 38, 42 for decreasing the amount of blade tip clearance variation due to in-plane bending moments which occur during operation of the power turbine 34. Since the aft frame 48 is joined at its inner band 48c to the inner rotor 42 it increases the rigidity thereof. Similarly, since the forward frame 50 is joined at its outer band 50b to the outer rotor 38, it also increases the rigidity thereof.

Blade tip clearances are further reduced by supporting the outer and inner rotors 38, 42 to the rear frame 46. Since the rear frame 46 is supported at its outer band 46b to the outer casing 36, it has a relatively large diameter with a correspondingly large structural rigidity. By supporting the power turbine 34 solely on the rear frame 46 instead of a conventional mid-frame (not shown) having a smaller diameter which is typically located between the core turbine 30 and the power turbine 34, an improved support system is created as well as providing close-coupling between the core turbine 30 and the power turbine 34 for channeling the combustion gases thereto with improved efficiency. The core turbine 30 is disposed axially forwardly of the outer and inner blades 40, 44 and may be positioned relatively close thereto by the elimination of the stationary mid-frame (not shown) typically used for supporting power turbines.

In the exemplary embodiment illustrated in FIG. 2, a conventional first bearing 52 is disposed between the aft shaft 48d and the rear shaft 46d for supporting the aft shaft 48d on the rear shaft 46d. A conventional second bearing 54 is disposed between the forward shaft 50d and the aft shaft 48d for supporting the forward shaft 50d on the aft shaft 48d. And, a conventional third bearing 56 is disposed between the core shaft 32 and the forward shaft 50d for supporting the core shaft 32 on the forward shaft 50d. In the exemplary embodiment illustrated in FIG. 2, the first, second and third bearings 52, 54, 56 are preferably roller bearings, with the second bearing 24 being a differential-type bearing since it is mounted between the two counter-rotating shafts 48d, 50d. Other types of bearings may be used as desired.

Since the outer casing 36 is stationary and surrounds the outer and inner blades 40, 44, and is fixedly joined to the rear frame 46 for its support at its outer diameter, the rear frame 46 provides a substantially rigid support for both power turbine rotors 38 and 42 as well as the aft end of the core shaft 32. To further increase the rigidity of the system, the rear shaft 46d is preferably frustoconical and extends axially forwardly from the rear frame 46 toward the aft shaft 48d. Similarly, the aft shaft 48d is preferably frustoconical and extends axially forwardly toward the forward shaft 50d. And, the forward shaft 50d is also frustoconical but extends axially aft toward the aft shaft 48d. In this way, the additional rigidity due to a cone shape is obtained from each of the shafts 46d, 48d, and 50d.

Figure 3:
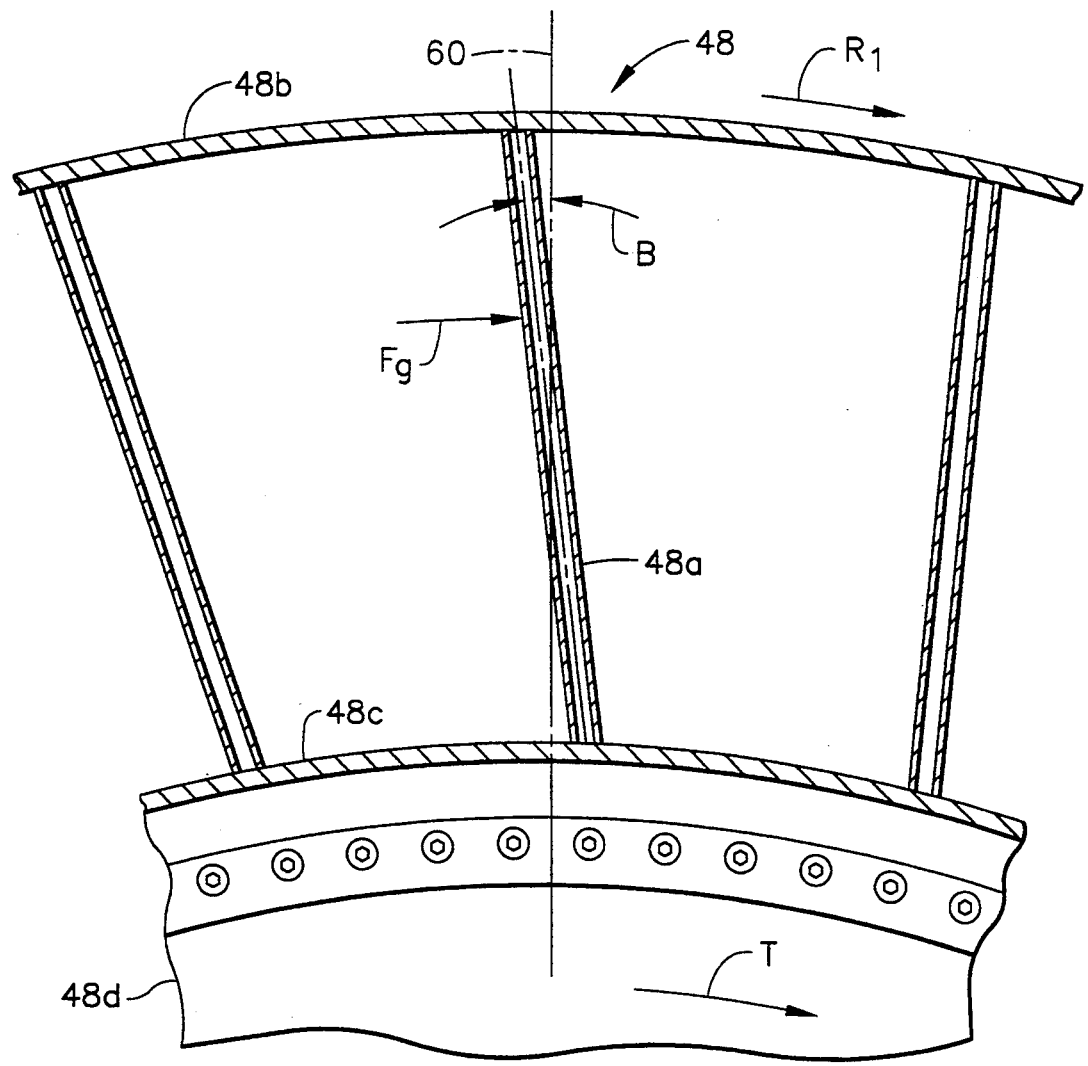
FIG. 3 is a radial, partly sectional view of a portion of the aft turbine frame illustrated in FIG. 2 and taken along line 3—3.
Figure 4:
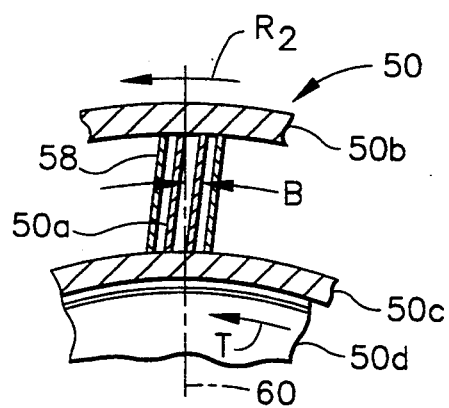
FIG. 4 is a radial, partly sectional view of a portion of the forward turbine frame illustrated in FIG. 2 and taken along line 4—4.

Since the aft and forward frames 48, 50 are integrally joined to their respective inner and outer rotors 42, 38, the struts thereof have conventional profiles for extracting energy from the combustion gases flowable therebetween, with output torque being channeled through the respective drive shafts 48d, 50d for powering the respective fan shafts 20, 22. FIGS. 3 and 4 illustrate portions of the frames 48, 50 with the rear frame 48 in this exemplary embodiment rotating in a first, clockwise direction $R_1$, and the forward frame 50 rotating in a second, opposite or counter-clockwise direction $R_2$. Since the combustion gases are relatively cool upon reaching the rear frame 48, it does not include a fairing such as the fairing 58 on the forward frame 50. Accordingly, the fairings 58 surrounding the struts 50a of the forward frame 50 are conventionally configured for channeling the combustion gases therethrough, with the struts 50a having a suitable and typically symmetrical configuration therein. The output torque from the frames 48, 50 is designated T and is illustrated in the two drive shafts 48d, 50d illustrated in FIGS. 3 and 4.

Since the aft and forward frames 48, 50 rotate during operation, the struts 48a, 50a thereof experience centrifugally generated tensile loads and corresponding stress therein. In order to reduce the tensile stress in the struts 48a, 50a, the struts are backwardly radially inclined relative to their respective directions of rotation so that the gas flow between the respective struts 48a, 50a tends to straighten the inclined struts to effect a compressive load component therein which is subtracted from the tensile stresses generated in the struts due to centrifugal force.

As illustrated in FIG. 3, the aft struts 48a are inclined from the radial axis designated 60 in a second direction opposite to the direction of rotation $R_1$ at an acute inclination angle B. In this way, the forces exerted on the strut 48a from the combustion gases and designated $F_g$ tend to straighten the inclined struts 48a, or decrease the value of the inclination angle B, which are confined between the outer and inner bands 48b, 48c. This constraint will effect a compressive load component through the struts 48a to generate a respective compressive stress component which is subtracted from the centrifugally generated tensile stresses therein for reducing the overall stresses within the struts 48a. The majority of the total torque T carried by the aft drive shaft 48d is generated by the inner blades 44 and is carried thereto from the inner rotor 42. The inner rotor 42 is fixedly joined to the inner band 48c at the drive shaft 48d with an additional component of the torque T being generated by the aft struts 48a for effecting the compressive load component therein.

In the FIG. 4 embodiment of the invention, the fairings 58 surround the struts 50a and therefore the gas loads act upon the fairings 58 and in turn are carried through the outer band 50b which also tends to straighten the inclined strut 50a. Again, the outer and inner bands 50b, 50c constrain the struts 50a from straightening which effects a compressive load component in a similar fashion to that generated in the aft frame 48. The forward struts 50a and the fairings 58 may be conventionally configured for not turning the combustion gases therethrough, and therefore without effecting gas loads thereon. However, since the outer rotor 38 is fixedly joined to the outer band 50b, the torque T from the outer rotor 38 generated by the outer blades 40 is channeled through the outer band 50b and in turn through the struts 50a to the inner band 50c and in turn to the forward drive shaft 50d. The torque T will tend to straighten the struts 50a, by reducing the inclination angle B, and therefore generate the compressive load component therein which again is subtracted from the centrifugally generated tensile loads therein.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A rotatable turbine frame combination for a gas turbine engine comprising:
    a rotatable turbine frame including;
    an annular outer band;
    an annular inner band spaced radially inwardly from said outer band and disposed coaxially therewith;
    a plurality of circumferentially spaced apart struts extending radially between said outer and inner bands and fixedly Joined thereto;
    an annular drive shaft fixedly joined to said inner band for transmitting output torque upon rotation of said frame in a first direction upon gas flow between said struts; and
    said struts being radially inclined in a second direction opposite to said first direction so that said gas flow between said struts tends to straighten said inclined struts by decreasing inclination thereof to effect a compressive load component therein; and
    an annular rotor fixedly joined to one of said outer and inner bands, and having a plurality of stages of rotor blades for rotating said rotor and in turn rotating said drive shaft.

2. A turbine frame combination according to claim 1 wherein said rotor is a radially inner rotor fixedly joined to said inner band at said drive shaft.

3. A turbine frame combination according to claim 1 wherein said rotor is a radially outer rotor fixedly joined to said outer band, 4. A turbine frame combination according to claim 1 further comprising:
    said turbine frame configured as an aft turbine frame, and wherein said rotor is a radially inner rotor fixedly joined to said inner band, said blades are inner blades extending radially outwardly from said inner rotor, and said drive shaft is an aft drive shaft; and further including
    another one of said turbine frames configured as a forward turbine frame, and wherein said rotor thereof is a radially outer rotor disposed coaxially with said inner rotor, said blades thereof are outer blades extending radially inwardly from said outer rotor, and said drive shaft thereof is a forward drive shaft spaced axially forwardly of said aft drive shaft; and
    said inner and outer rotors are configured for counterrotation.

5. A turbine frame combination according to claim 1 further comprising a plurality of fairings, each surrounding a respective one of said struts.

* * * * *